US008155793B2

(12) United States Patent
Nakajima et al.

(10) Patent No.: US 8,155,793 B2
(45) Date of Patent: Apr. 10, 2012

(54) SYSTEM AND METHOD FOR CONTROLLING AIR CONDITIONING FACILITIES, AND SYSTEM AND METHOD FOR POWER MANAGEMENT OF COMPUTER ROOM

(75) Inventors: Tadakatsu Nakajima, Kasumigaura (JP); Takeshi Kato, Akishima (JP); Yoko Shiga, Yokohama (JP); Hitoshi Matsushima, Ryugasaki (JP)

(73) Assignee: Hitachi, Ltd., Tokyo (JP)

( * ) Notice: Subject to any disclaimer, the term of this patent is extended or adjusted under 35 U.S.C. 154(b) by 224 days.

(21) Appl. No.: 12/544,143

(22) Filed: Aug. 19, 2009

(65) Prior Publication Data
US 2010/0076608 A1   Mar. 25, 2010

(30) Foreign Application Priority Data
Sep. 25, 2008 (JP) ................. 2008-246522

(51) Int. Cl.
*G06F 19/00* (2011.01)
(52) U.S. Cl. ......... 700/277; 700/276; 700/278; 700/281
(58) Field of Classification Search .................. 700/276, 700/277, 278, 281
See application file for complete search history.

(56) References Cited

U.S. PATENT DOCUMENTS

| 7,165,412 | B1 * | 1/2007 | Bean, Jr. ............... | 62/259.2 |
| 7,342,789 | B2 * | 3/2008 | Hall et al. ............... | 361/701 |
| 7,486,513 | B2 * | 2/2009 | Hall et al. ............... | 361/699 |
| 7,584,369 | B2 * | 9/2009 | Capps et al. ............ | 713/300 |
| 7,620,480 | B2 * | 11/2009 | Patel et al. ............. | 700/276 |
| 7,716,006 | B2 * | 5/2010 | Coskun et al. .......... | 702/132 |
| 2007/0100494 | A1 * | 5/2007 | Patel et al. ............. | 700/190 |
| 2009/0222139 | A1 * | 9/2009 | Federspiel ............. | 700/278 |
| 2009/0276095 | A1 * | 11/2009 | Pienta et al. .......... | 700/277 |

FOREIGN PATENT DOCUMENTS

| JP | 2004-126968 A | 4/2004 |
| JP | 2006-064283 A | 3/2006 |

OTHER PUBLICATIONS

"Increasing Data Center Energy Efficiency by Monitoring and Targeting to Heating and Cooling Metrics", Hunter et al, Trendpoint 2008.*

* cited by examiner

*Primary Examiner* — Michael D Masinick
(74) *Attorney, Agent, or Firm* — Foley & Lardner LLP

(57) ABSTRACT

The present invention relates to a system and method for controlling air conditioning facilities, and a system and method for power management of a computer room. In an air-conditioning facility control system of a computer room (cooling room) equipped with air-conditioning facilities for air-cooling the computer room in which a large number of information processing units are installed, an air-conditioner monitoring and controlling unit calculates a temperature sensitivity coefficient of each information processing unit, and that of each air conditioner, and then determines discharge air temperature of each air conditioner by use of the temperature sensitivity coefficients in such a manner that the sum of squares of a deviation of a change in discharge air temperature of each information processing unit becomes the smallest, and in such a manner that the sum total of the power consumption of the individual air conditioners becomes the smallest.

8 Claims, 7 Drawing Sheets

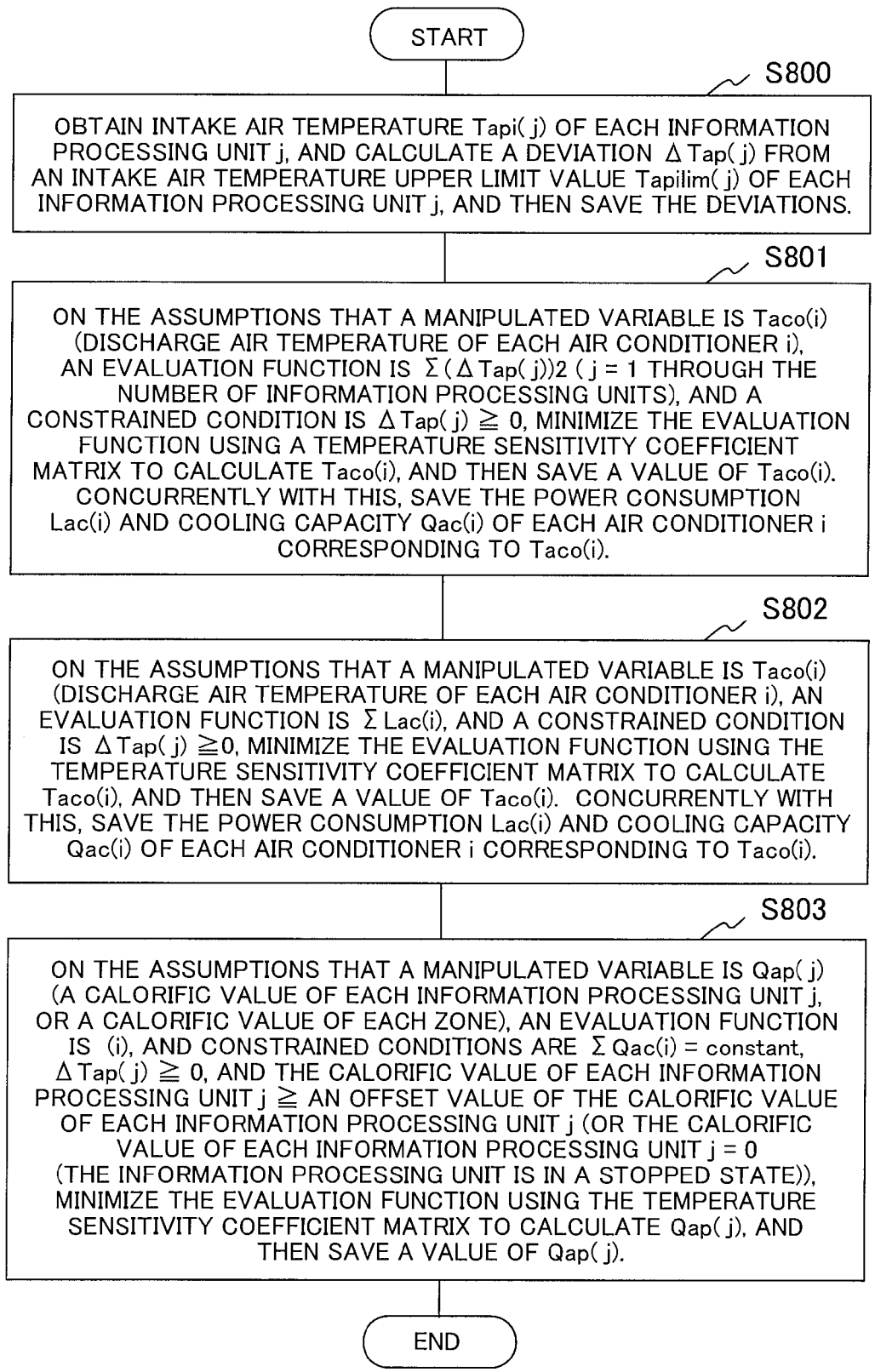

SYSTEM AND METHOD FOR CONTROLLING AIR CONDITIONING FACILITIES, AND SYSTEM AND METHOD FOR POWER MANAGEMENT OF COMPUTER ROOM

CLAIMS OF PRIORITY

The present application claims priority from Japanese patent application serial no. JP2008-246522, filed on Sep. 25, 2008, the content of which is hereby incorporated by reference into this application.

BACKGROUND OF THE INVENTION

The present invention relates to a system and method for controlling air conditioning facilities, and a system and method for power management of a computer room. In particular, the invention relates to an air-conditioning facility control system and method for, in a computer room (cooling room) equipped with air-conditioning facilities for air-cooling the computer room in which a large number of information processing units are installed, properly cooling the individual information processing units with the air-conditioning facilities operated in an energy-saving manner, and a power management system and method for power management of the computer room.

In a large-scale computer room typified by a data center, a large number of racks each storing information processing units such as a server and a file device (hereinafter simply referred to as a "unit") are placed in rows. In addition, the computer room is equipped with a plurality of air conditioners that function as facilities for eliminating heat generated by the individual units (hereinafter referred to as an "air conditioner"). Because most of the units employ an air-cooling system, the air conditioners cool warm discharge air heated by the individual units, and then supplies the individual units with cool air again.

In general, computer rooms often have a double floor structure. Accordingly, cool air generated by the air conditioners is discharged into space between floors. The cool air is then supplied from a large number of air supply openings in proximity to the units. The supplied cool air is taken into each individual unit by a fan that is built into each individual unit. The cool air is then heated by electronic parts, and is increased in temperature, followed by discharging to the outside of the individual units. The discharge air is fed back to the air conditioners through space between the racks and a ceiling, or through exhaust ducts that are specially provided in the computer room and the roof space. In general, the power consumption of the air conditioners ranges from one half to one third of the required cooling capacity (a total calorific value of the units, and a total calorific value of power supply facilities); and the power consumption required for supplying air is about one sixth of the required cooling capacity. Therefore, the power consumption of the whole computer room is about 1.5 times that of the units.

On the other hand, the really required intake temperature of cooling air to be taken into the individual units varies depending on the information processing capability of the units, and an operating ratio that changes every minute. However, for the current computer room, the air conditioners are operated with the discharge air temperature (air supply temperature) of the air conditioners set at a particular value requested by a unit whose required cool air temperature is the lowest. As a result, cool air whose temperature is lower than necessary is taken into most of the units, which leads to a huge amount of energy loss. From the viewpoint of the current tendencies to prevent global warming, and to reduce energy costs, the reduction in energy loss is strongly required.

For the purpose of the reduction in energy loss, venders are making efforts to improve the efficiency of units and that of air conditioners. In addition, when a computer room is designed, units, air conditioners, and air supply openings are located in best place; and the numbers of the units, air conditioners, and air supply openings to be arranged are optimized, whereby cool air is efficiently supplied so that energy saving is achieved. On the other hand, from an operational point of view, the following energy saving methods are proposed and implemented. For example, the power consumption is reduced by one-side shifting of information processing units using a virtual technique. Alternatively, a damper is provided at each individual air supply opening connected between space above floor and space under floor, and the temperature of each individual unit, which changes every minute, is sensed to optimize the amount of supply air from air-conditioning facilities so that energy saving of the air-conditioning facilities is achieved.

Moreover, JP-A-2004-126968 proposes that when discharge air temperature of a certain unit is low, a job moved from another unit is assigned to the unit in question, or a new job is assigned to the unit in question, so that cool air is effectively used to achieve energy saving.

In contrast, JP-A-2006-64283 proposes a control method for controlling air-conditioning facilities although the purpose of the control method is not energy saving. The control method includes the steps of: successively changing set temperature of each air conditioner one by one to determine the extent of influence to which cooling-air generation temperature of each air conditioner influences air temperature of individual units; graphically illustrating the extent of influence; when abnormal temperature is detected in a certain unit, indicating, as guidance, which air conditioner's set temperature should be changed for effective cooling; and controls the set temperature of the air conditioner.

In the prior art disclosed in JP-A-2004-126968, the air temperature in a computer room can be substantially uniformed by performing job scheduling on the basis of temperature information obtained from temperature distribution, and then by controlling the distribution of a load to each individual unit. Thus, energy saving of air conditioning facilities is achieved. However, efficiency characteristics of individual air conditioners constituting air-conditioning facilities are not considered; therefore the individual air conditioners may also be uniformly operated in a partial load mode with low efficiency. In some cases, a larger amount of energy may be consumed.

In addition, in the prior art disclosed in JP-A-2006-64283, the control of air conditioning facilities is merely disclosed as measures to cope with an abnormal state and energy consumption is not taken into consideration. Furthermore, since the guidance displayed on a display unit does not indicate a specific value of the changed set temperature of each air conditioner, the set temperature of each air conditioner must be changed offline according to another guidance (not disclosed).

The present invention has been made to solve the above-described problems, and a primary object of the present invention is to provide an energy saving control method for minimizing the power consumption of air-conditioning facilities while cool air temperature conditions, which are required by individual information processing units disposed in the computer room, are satisfied.

Moreover, another object of the present invention is to provide a system in which the ideal distribution of heat generation in the computer room as viewed from the air conditioning facility side (more specifically, a ratio of a load imposed on each information processing unit) is calculated and cooperation with a monitoring and controlling unit on the information processing unit side is achieved to thereby reduce the power consumption of the computer room as a whole.

SUMMARY OF THE INVENTION

According to one aspect of the present invention, there is provided an air-conditioning facility control system for a computer room in which one or more information processing units and one or more air conditioners are placed, the air-conditioning facility control system temperature sensors for measuring temperature, each temperature sensor being provided at an intake air portion through which air circulating in the computer room is taken into the information processing unit, at a discharge air portion through which the air taken into the information processing unit is discharged, at an intake air portion through which air circulating in the computer room is taken into the air conditioner, and at a discharge air portion through which the air taken into the air conditioner is discharged.

The air-conditioning facility control system further includes: an information-processing-unit monitoring and controlling unit for monitoring and controlling the information processing units; and an air-conditioner monitoring and controlling unit for monitoring and controlling the air conditioners, and for inputting the output of the temperature sensors.

Based on the actual operation in the computer room, or by means of simulation, the air-conditioner monitoring and controlling unit calculates a temperature sensitivity coefficient of each information processing unit associated with each air conditioner, and a temperature sensitivity coefficient of each air conditioner associated with each information processing unit.

Next, the discharge air temperature of each air conditioner is determined by use of these temperature sensitivity coefficients in such a manner that the sum of squares of a deviation of a change in discharge air temperature of each information processing unit becomes the smallest.

In addition, the discharge air temperature of each air conditioner is determined by use of these temperature sensitivity coefficients in such a manner that the sum total of the power consumption of the individual air conditioners becomes the smallest. The air-conditioner monitoring and controlling unit then instructs each air conditioner to operate at the discharge air temperature.

Moreover, as a power management system, a calorific value of each information processing unit is determined by use of these temperature sensitivity coefficients in such a manner that the sum total of the power consumption of the individual air conditioners becomes the smallest. The calorific value is then transmitted to the information-processing-unit monitoring and controlling unit. The information-processing-unit monitoring and controlling unit assigns a job (load) to each information processing unit in such a manner that the job is appropriate to a calorific value of each information processing unit.

BRIEF DESCRIPTION OF THE DRAWINGS

FIG. 8 is a flowchart illustrating how to make calculations to minimize the power consumption of individual air conditioners by a power-consumption minimization calculation module 633.

DESCRIPTION OF THE PREFERRED EMBODIMENTS

An embodiment of the present invention will be described below with reference to FIGS. 1 through 8.

First of all, how information processing units and air-conditioning facilities in a computer room are configured according to one embodiment of the present invention will be described with reference to FIG. 1.

Figure 1:
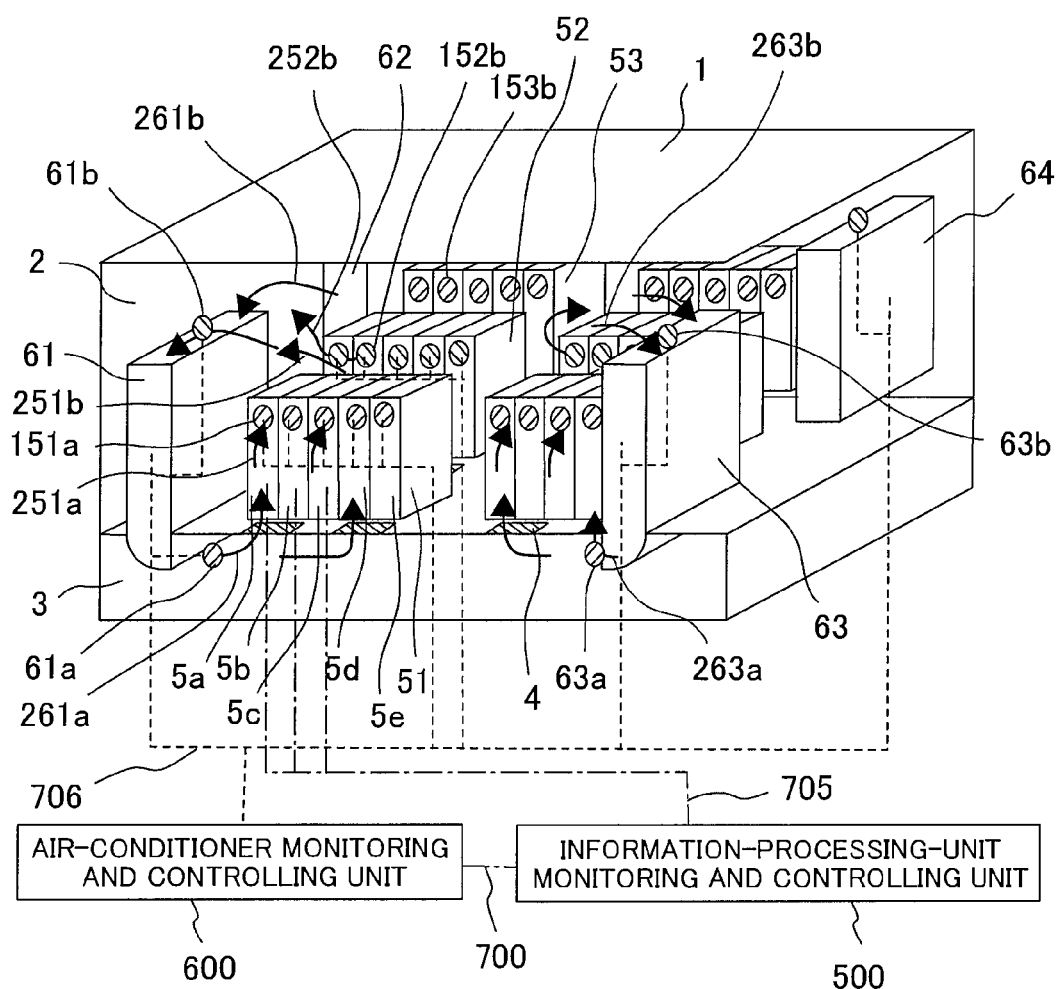
FIG. 1 is a bird's-eye view illustrating how information processing units and air conditioning facilities in a computer room are configured according to one embodiment of the present invention.

FIG. 1 is a bird's-eye view illustrating how information processing units and air conditioning facilities in a computer room are configured according to one embodiment of the present invention.

A computer room 1 according to this embodiment is constituted of a main space above floor 2, and a cool air supply space under floor 3. A floor is provided with a plurality of air supply openings 4 through which cool air is supplied from the space under floor to the space above floor.

A plurality of rack rows 51 through 53, each of which is constituted of a plurality of racks 5a through 5e, are disposed in the computer room. Each of the racks 5a through 5e stores one or more information processing units (not illustrated). The computer room is equipped with one or more air conditioners 61 through 64 so that these information processing units are cooled.

In addition, there are provided various sensors including: an intake air sensor 151a for measuring the temperature of air taken into each rack; discharge air sensors 152b, 153b for measuring the temperature of air discharged from each rack; discharge air temperature sensors 61a, 63a for measuring the temperature of air discharged from each air conditioner; and intake air temperature sensors 61b, 63b for measuring the temperature of air taken into each air conditioner. Incidentally, a discharge air sensor 151b of the rack 5a is mounted on a surface on the opposite side of the intake air sensor 151a so that the discharge air sensor 151b faces the discharge air sensor 152b. Accordingly, the discharge air sensor 151b is not illustrated.

Moreover, there are also provided: an information-processing-unit monitoring and controlling unit 500 for monitoring the information processing units stored in the racks 5a through 5e, and for giving instructions to control the information processing units; and an air-conditioner monitoring and controlling unit 600 for monitoring the air conditioners 61 through 64, and for giving instructions to control the air conditioners 61 through 64.

Further, the computer room 1 is equipped with: a communication line 700 that makes a connection between the information-processing-unit monitoring and controlling unit 500 and the air-conditioner monitoring and controlling unit 600; a communication line 705 through which an operational state of each information processing unit is inputted and controlled; and a communication line 706 through which the cool air temperature and operational state of each air conditioner are inputted and controlled.

Cool air whose heat has been removed by the air conditioners 61 through 64 is discharged to the cool air supply space under floor 3. The cool air is then supplied to the main space above floor 2 through the air supply openings 4. The currents of supplied air 261a, 263a are taken into the information processing units by fans (not illustrated) included therein (251a, 253a), and are then heated by the information processing units so that the temperature of the currents of air are increased before they are discharged as currents of warm air 251b, 252b respectively. The discharge air discharged from the individual racks is collected, and is then drawn into the individual air conditioners 61 through 64 (261b, 263b).

Incidentally, according to this embodiment, the intake air temperature and discharge air temperature of the information processing units are sensed on a rack basis as shown in FIG. 1. However, it is more desirable that they are sensed on an information processing unit basis. In addition, instead of providing both the intake air sensor and the discharge air sensor, providing only one of them also suffices. Moreover, the intake air sensor and the discharge air sensor may also be provided not on a rack basis but a rack group basis. However, if the density of temperature sensing points is low, temperature information used to control the information processing units and the air conditioners according to this embodiment is not reliably collected although an energy saving effect can be achieved.

Additionally, this embodiment describes a case where underfloor air conditioning is employed. However, the underfloor space may also be eliminated so that cool air discharged from the air conditioners is directly supplied to the space in which the information processing units are placed. Moreover, according to this embodiment, space between rack groups and a ceiling of the computer room is shown as a flow path of air discharged from the information processing units. However, a discharge air duct may also be provided in this space or in the roof space. Furthermore, other configurations that can be guessed from FIG. 1 illustrating this embodiment may also be employed. To be more specific, each air conditioner may also be placed in parallel with the rack rows; an intake air temperature sensor and a discharge air temperature sensor may also be built into an air conditioner; or an intake air temperature sensor and a discharge air temperature sensor may also be built into each information processing unit.

Next, a configuration of the air-conditioner monitoring and controlling unit 600 will be described with reference to FIGS. 2 and 3.

Figure 2:
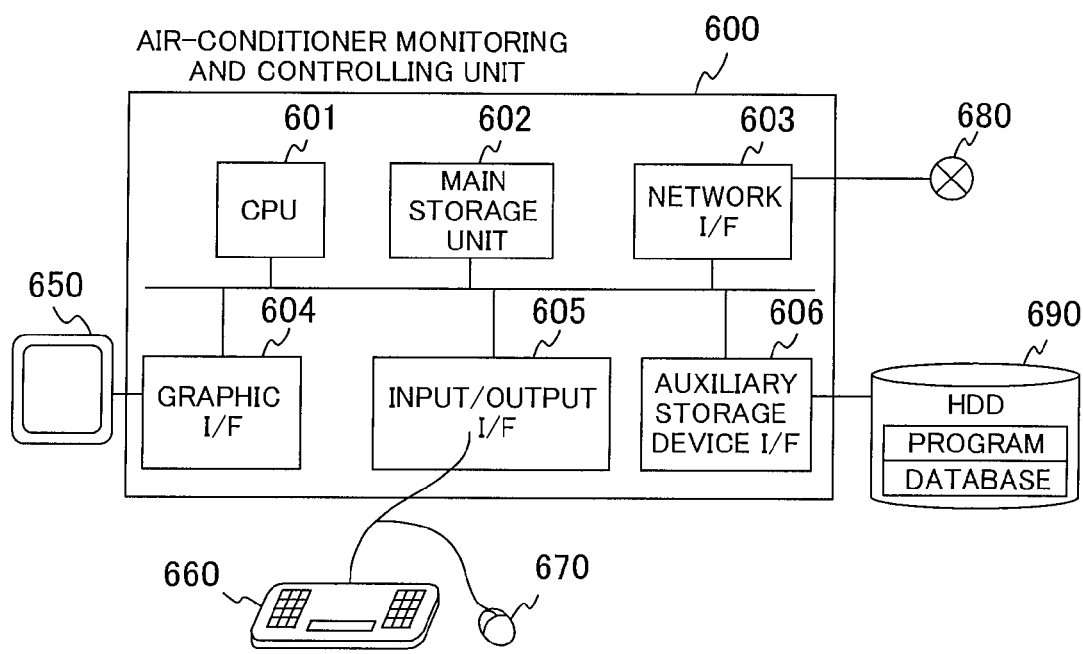
FIG. 2 is a diagram illustrating a hardware configuration of an air-conditioner monitoring and controlling unit 600.

FIG. 2 is a diagram illustrating a hardware configuration of the air-conditioner monitoring and controlling unit 600.

Figure 3:
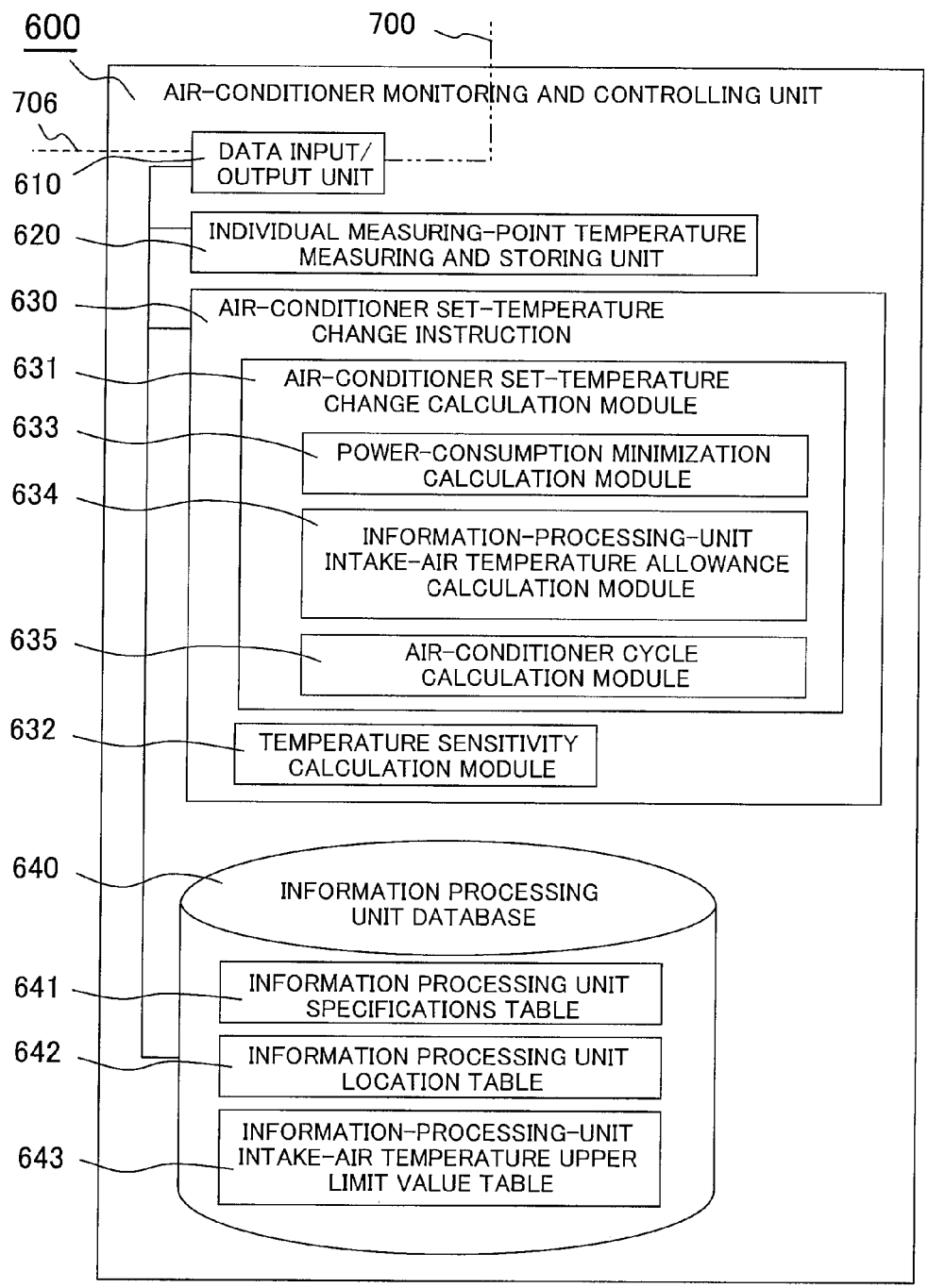
FIG. 3 is a diagram illustrating a functional configuration of the air-conditioner monitoring and controlling unit 600.

FIG. 3 is a diagram illustrating a functional configuration of the air-conditioner monitoring and controlling unit 600.

As shown in FIG. 2, hardware of the air-conditioner monitoring and controlling unit 600 is configured in a manner similar to that of general personal computers.

The air-conditioner monitoring and controlling unit 600 has a configuration in which a CPU (Central Processing Unit) 601, a main storage unit 602, a network I/F 603, a graphic I/F 604, an input/output I/F 605, and an auxiliary storage device I/F 606 are connected to one another through buses.

The CPU 601 controls individual elements of the air-conditioner monitoring and controlling unit 600 so that individual modules for monitoring and controlling the air conditioners, which will be described later, are loaded into the main storage unit 602, and are then executed.

The main storage unit 602 is usually formed of a volatile memory such as a RAM. The main storage unit 602 stores a program which the CPU 601 executes, and data which the CPU 601 referred to.

The network I/F 603 is an interface through which the air-conditioner monitoring and controlling unit 600 is connected to an external network 680.

The graphic I/F 604 is an interface through which a display unit 650 such as a LCD (Liquid Crystal Display) is connected to the air-conditioner monitoring and controlling unit 600.

The input/output I/F 605 is an interface through which an I/O device is connected to the air-conditioner monitoring and controlling unit 600. In the example shown in FIG. 2, a keyboard 660, and a mouse 670 used as a pointing device, are connected to the air-conditioner monitoring and controlling unit 600.

The auxiliary storage device I/F 606 is an interface through which an auxiliary storage device such as a HDD (Hard Disk Drive) 690 is connected to the air-conditioner monitoring and controlling unit 600.

The HDD 690 has large storage capacity, and stores a program for monitoring/controlling air conditioners, and a database.

As shown in FIG. 3, from a functional point of view, the air-conditioner monitoring and controlling unit 600 according to this embodiment includes a data input/output unit 610, an individual measuring-point temperature measuring and storing unit 620, and an air-conditioner set-temperature change instruction unit 630. The air-conditioner monitoring and controlling unit 600 further includes an information processing unit database 640 that is used as a database referred to by these units.

The air-conditioner set-temperature change instruction unit 630 includes an air-conditioner set-temperature change calculation module 631, and a temperature sensitivity calculation module 632. The air-conditioner set-temperature change calculation module 631 includes a power-consumption minimization calculation module 633, an information-processing-unit intake-air temperature allowance calculation module 634, and an air-conditioner cycle calculation module 635.

Here, the information processing unit database 640 of the air-conditioner monitoring and controlling unit 600 is used as a database referred to by these modules. The information processing unit database 640 stores an information processing unit specifications table 641, an information processing unit location table 642, and an information-processing-unit intake-air temperature upper limit value table 643, all of which are updatable.

The data input/output unit 610 receives the following data: temperature data obtained by sensors for sensing the temperature of the intake air and discharge air of the individual information processing units; temperature data and operating state data obtained by sensors for sensing the air temperature of the discharge air and intake air of the individual air conditioners; and data about operating states of the individual information processing units, the data being collected by the information-processing-unit monitoring and controlling unit 500. In addition, the data input/output unit 610 transmits a set-temperature control value for each air conditioner, and transmits, to the information-processing-unit monitoring and controlling unit 500, a desirable calorific value (control guidance of information processing units) on a predetermined rack basis.

The individual measuring-point temperature measuring and storing unit 620 stores the temperature data of the individual information processing units, and that of the individual air conditioners. The temperature data has been received by the data input/output unit 610.

The air-conditioner set-temperature change instruction unit 630 gives an instruction to each air conditioner through the data input/output unit 610 so that set temperature is changed.

Next, the air-conditioner set-temperature change calculation module 631 included in the air-conditioner set-temperature change instruction unit 630 is a module for carrying out calculation to change the set temperature of each air conditioner.

The power-consumption minimization calculation module 633 is a submodule of the air-conditioner set-temperature change calculation module 631, and has a function of calculating the sum total of the power consumption of the air conditioners.

The information-processing-unit intake-air temperature allowance calculation module 634 is a submodule of the air-conditioner set-temperature change calculation module 631, and has a function of calculating an overall deviation of the intake air temperature of the individual information processing units from the intake air temperature specified as an upper limit.

This information-processing-unit intake-air temperature allowance calculation module 634 refers to the information processing unit location table 642 and the information-processing-unit intake-air temperature upper limit value table 643, both of which are included in the information processing unit database 640. The information-processing-unit intake-air temperature allowance calculation module 634 then calculates deviations of the intake air temperature of the individual information processing units (each upper limit temperature value–temperature in each corresponding location environment) from temperature data of the individual information processing units in location environments. The temperature data is data that has been obtained by the individual measuring-point temperature measuring and storing unit 620.

The air-conditioner cycle calculation module 635 is a submodule of the air-conditioner set-temperature change calculation module 631, and has a function of calculating the amount of heat associated with cooling cycles of the individual air conditioners to calculate the power consumption of the individual air conditioners.

The temperature sensitivity calculation module 632 is a module for calculating a temperature sensitivity coefficient of each information processing unit associated with each air conditioner, and a temperature sensitivity coefficient of each air conditioner associated with each information processing unit, and then for storing the temperature sensitivity coefficients as a temperature sensitivity coefficient matrix.

As described later, this temperature sensitivity coefficient matrix is used when the air-conditioner set-temperature change calculation module 631 calculates set temperature of an air conditioner.

Next, a configuration of the information-processing-unit monitoring and controlling unit 500 will be described with reference to FIGS. 4 and 5.

Figure 4:
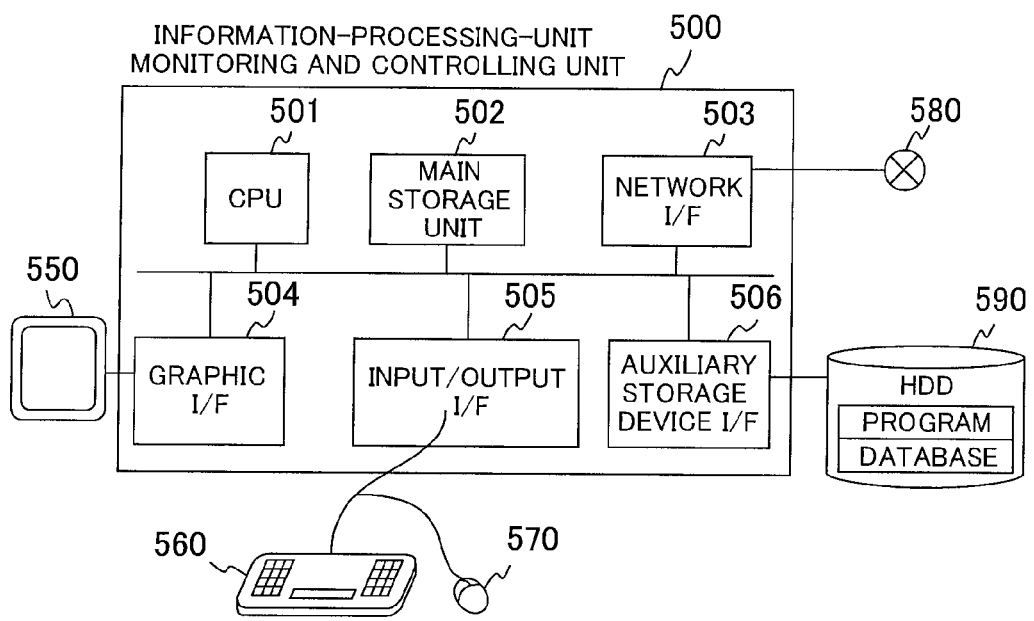
FIG. 4 is a diagram illustrating a hardware configuration of an information-processing-unit monitoring and controlling unit 500.

FIG. 4 is a diagram illustrating a hardware configuration of the information-processing-unit monitoring and controlling unit 500.

Figure 5:
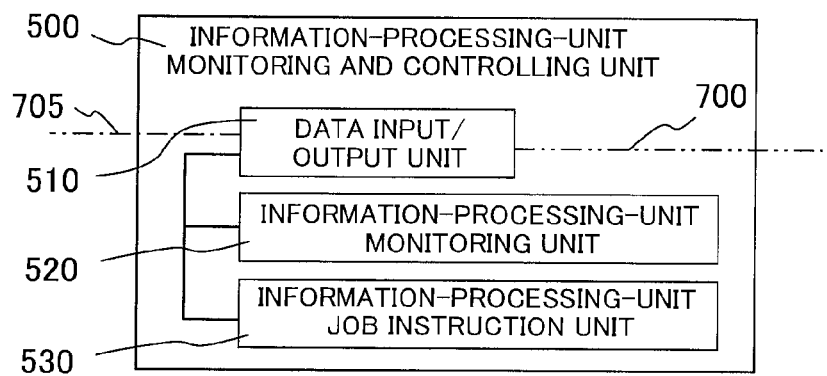
FIG. 5 is a diagram illustrating a functional configuration of the information-processing-unit monitoring and controlling unit 500.

FIG. 5 is a diagram illustrating a functional configuration of the information-processing-unit monitoring and controlling unit 500.

As shown in FIG. 4, hardware of the information-processing-unit monitoring and controlling unit 500 is configured in a manner similar to that of general personal computers or servers.

As is the case with the air-conditioner monitoring and controlling unit 600 shown in FIG. 2, the hardware of the information-processing-unit monitoring and controlling unit 500 has a configuration in which a CPU (Central Processing Unit) 501, a main storage unit 502, a network I/F 503, a graphic I/F 504, an input/output I/F 505, and an auxiliary storage device I/F 506 are connected to one another through buses. Functions of individual elements are substantially the same as those of the air-conditioner monitoring and controlling unit 600.

Further, as is the case with the air-conditioner monitoring and controlling unit 600, an external network 580 is connected to the network I/F 503; a display unit 550 is connected to the graphic I/F 504; a keyboard 560 and a mouse 570 are connected to the input/output I/F 505; and an auxiliary storage devices such as a HDD (Hard Disk Drive) 590 is connected to the auxiliary storage device I/F 506.

A database stored in the HDD 590 includes data used to control the individual information processing units. In addition, a program stored in the HDD 590 is a control module for monitoring the individual information processing units, and for assigning a job to each individual information processing unit.

From a functional point of view, the information-processing-unit monitoring and controlling unit 500 according to this embodiment includes: a data input/output unit 510 that is connected to the communication line 705; an information-processing-unit monitoring unit 520 for monitoring operating states of the individual information processing units; and an information-processing-unit job instruction unit 530 for assigning a job to each individual information processing unit.

The information-processing-unit job instruction unit 530 optimizes assignment of jobs to the individual information processing units on the basis of data obtained by the information-processing-unit monitoring unit 520. Here, the optimization of the job assignation means that a large number of jobs flowing to the computer room in a time-series manner are completed within a limited time with the total amount of the power consumption minimized in consideration of both the processing time based on the volume of each job, and the power consumption of each information processing unit. In addition, if necessary, the information-processing-unit job instruction unit 530 optimizes the job assignment to the individual information processing units in consideration of a constrained condition of a constant calorific value on an information processing unit basis, or for each zone into which racks are grouped. The constrained condition is output from the air-conditioner monitoring and controlling unit 500. The result of the job assignment is transmitted to the individual information processing units through the data input/output unit 510, and is also output to the air-conditioner monitoring and controlling unit 500 through the communication line 700.

Incidentally, the information processing unit database 640 shown in FIG. 3 may also be built into the information-processing-unit monitoring and controlling unit 500.

Next, how to control air-conditioning facilities according to one embodiment of the present invention will be described with reference to FIGS. 6 through 8.

First of all, how to determine a temperature sensitivity coefficient of each information processing unit associated with each air conditioner, and a temperature sensitivity coefficient of each air conditioner associated with each information processing unit will be described with reference to FIGS. 6 and 7.

Figure 6:
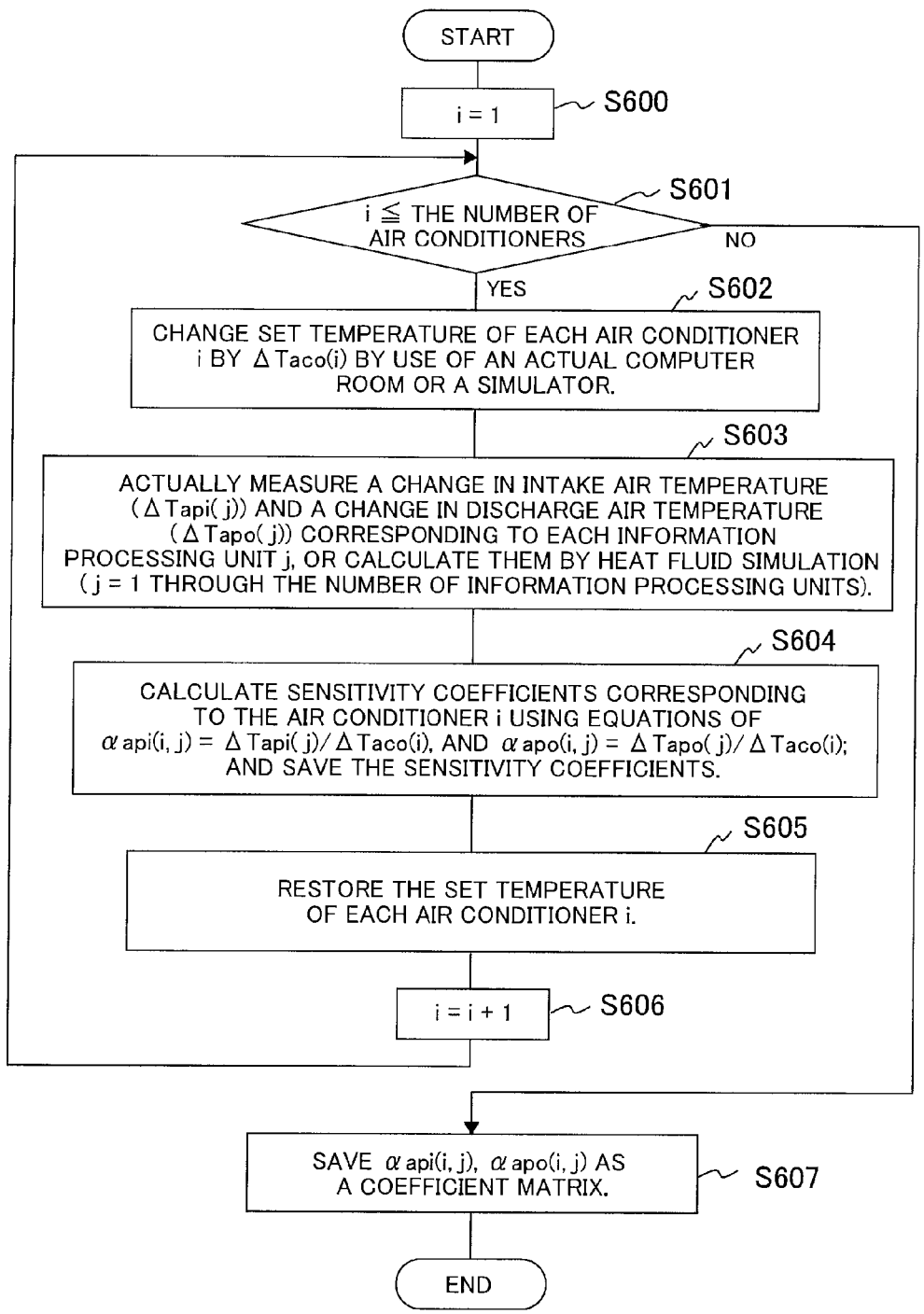
FIG. 6 is a flowchart illustrating how to determine a temperature sensitivity coefficient of each information processing unit associated with each air conditioner.

FIG. 6 is a flowchart illustrating how to determine a temperature sensitivity coefficient of each information processing unit associated with each air conditioner.

Figure 7:
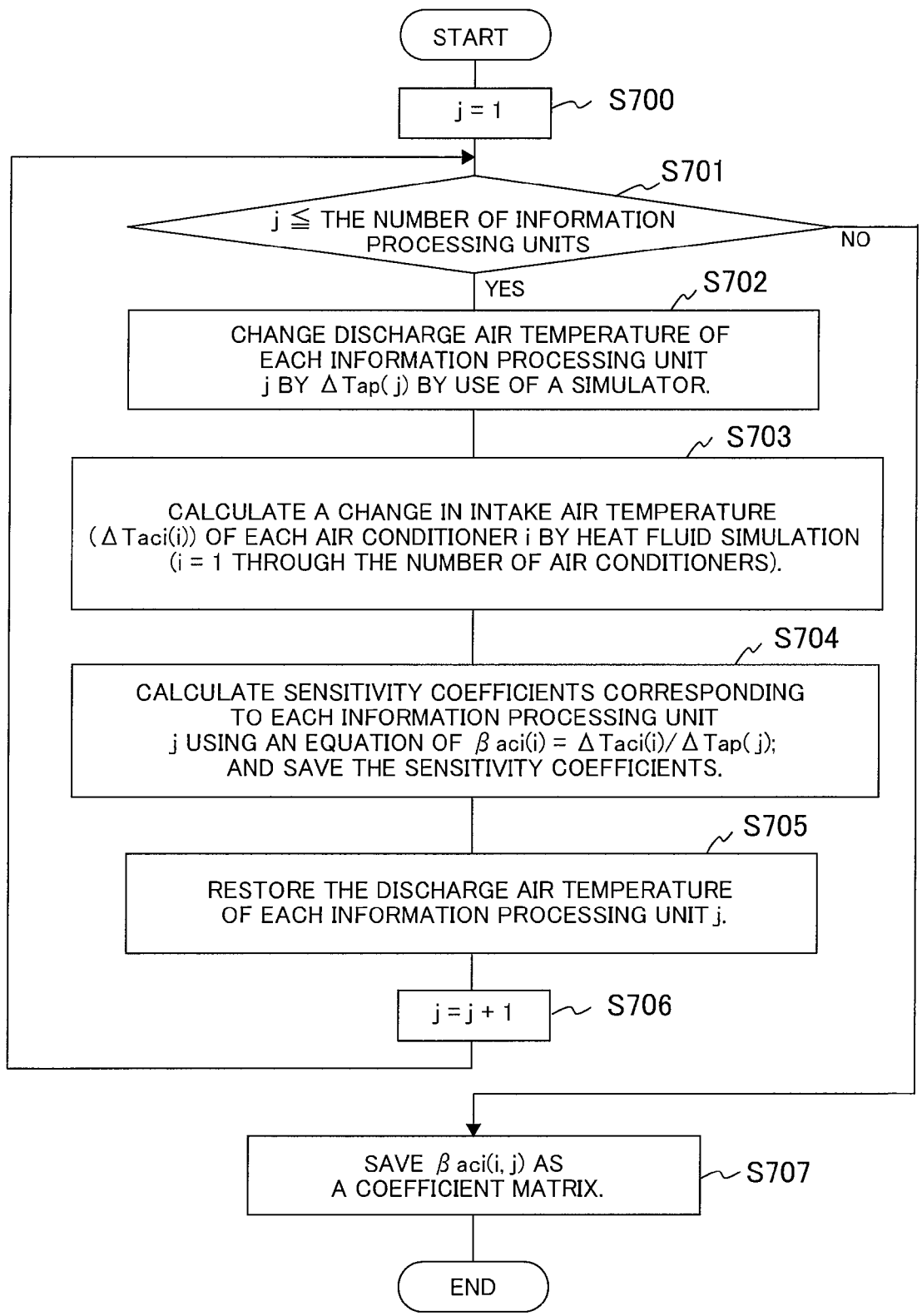
FIG. 7 is a flowchart illustrating how to determine a temperature sensitivity coefficient of each air conditioner associated with each information processing unit.

FIG. 7 is a flowchart illustrating how to determine a temperature sensitivity coefficient of each air conditioner associated with each information processing unit.

These temperature sensitivity coefficients are calculated by the temperature sensitivity calculation module 632 shown in FIG. 3. To be more specific, what are calculated are: the extent to which a change in set temperature of each air conditioner influences the location environment temperature of each information processing unit, and the extent to which a calorific value of each information processing unit influences the intake air temperature of each air conditioner. A table or an approximate expression is then made from the temperature sensitivity coefficients. In this example, the temperature sensitivity coefficients are stored in a matrix form.

As shown in FIG. 6, first of all, in order to determine the extent to which a change in set temperature of each air conditioner influences the location environment temperature of each information processing unit, an index i of air conditioners is initialized (S600).

Next, a series of processing in steps S602 through S606 is executed the number of times equivalent to the number of air conditioners (S601).

The air-conditioner set-temperature change instruction unit 630 instructs an i-th air conditioner to actually change a set value of discharge air temperature by $\Delta Taco$ (i) (change width) by use of an actual computer room (S602). A change in location environment temperature of a j-th information processing unit is measured by the sensors 151a, 152b, and 153b. This measurement is performed the number of times equivalent to the number of information processing units (more specifically, j=1 through the number of information processing units) so that the amount of change in location environment temperature of each j-th information processing unit ($\Delta Tapi$ (j), $\Delta Tapo$ (j)) are determined (S603). Here, $\Delta Tapi$ (j) is the amount of change in intake air temperature of each j-th information processing unit; and $\Delta Tapo$ (j) is the amount of change in discharge air temperature of each j-th information processing unit.

Next, ratios of the amount of change in location environment temperature of each j-th information processing unit ($\Delta Tapi$ (j), $\Delta Tapo$ (j)) to the change width of a temperature set value of each i-th air conditioner are determined, and are then saved (S604). These ratios are temperature sensitivity coefficients of each j-th information processing unit associated with each i-th air conditioner.

These temperature sensitivity coefficients aapi (i, j), aapo (i, j) are expressed in the following equations 1 and 2:

$$aapi(i,j) = \Delta Tapi(j)/\Delta Taco(i) \quad \text{(Equation 1)}$$

$$aapo(i,j) = \Delta Tapo(j)/\Delta Taco(i) \quad \text{(Equation 2)}$$

where aapi (i, j) is a temperature sensitivity coefficient of the intake air temperature of each j-th information processing unit; and aapo (i, j) is a temperature sensitivity coefficient of the discharge air temperature of each j-th information processing unit.

On the completion of the above processing, the discharge air temperature set value of the air conditioner whose temperature set value has been changed is restored (S605).

Next, i is incremented by one, before the process returns to the step S601 (S606).

On the completion of the processing for all air conditioners, the temperature sensitivity coefficients are saved as a coefficient matrix (i, j) (aapi (i, j), aapo (i, j)) formed of air conditioner rows i and information processing unit columns j (S607). It is to be noted that a heat fluid simulator may also be used to virtually perform the same processing as the above.

Next, in order to determine the extent to which a change in set temperature of each air conditioner influences the location environment temperature of each information processing unit, as shown in FIG. 7, first of all, an index j of information processing units is initialized (S700).

Because it is difficult to measure the extent to which the intake air temperature of each air conditioner influences the location environment temperature of each information processing unit by use of the actual computer room, a heat fluid simulator is used.

Next, a series of processing in steps S702 through S706 is executed the number of times equivalent to the number of information processing units (S701).

Here, the discharge air temperature of a j-th information processing unit is changed by $\Delta Tap$ (j) (change width) by use of the heat fluid simulator (S702).

Next, the intake air temperature of an i-th air conditioner is calculated to determine the amount of change in intake air temperature ($\Delta Taci$ (i)) of the i-th air conditioner (S703). To be more specific, the above processing is performed the number of times equivalent to the number of the air conditioners (i=1 through the number of air conditioners).

Next, a ratio of the amount of change in intake air temperature of each i-th air conditioner ($\Delta Taci$ (i)) to the change width of a set value of the discharge air temperature of each j-th information processing unit is determined, and is then saved (S704). This ratio is a temperature sensitivity coefficient of each j-th information processing unit associated with each i-th air conditioner.

This temperature sensitivity coefficient Baci (i, j) is expressed by the following equation 3:

$$Baci(i,j) = \Delta Taci(i)/\Delta Tap(j) \quad \text{(Equation 3)}$$

On the completion of the above processing, the discharge air temperature set value of the information processing unit whose temperature set value has been changed is restored (S705).

Next, j is incremented by one, before the process returns to the step S701 (S706).

On the completion of the processing for all air conditioners, the temperature sensitivity coefficients are saved as a coefficient matrix (i, j) (Baci (i, j)) formed of air conditioner rows i and information processing unit columns j (S707).

The series of processing described above may also be performed as follows: instead of particularly artificially changing settings of the air conditioners and those of the information processing units, obtaining, in a time-series manner, a change in load factor of each information processing unit, which changes every minute, a change in calorific value caused by the change in load factor, and a change in intake air temperature of each air conditioner; and using mathematical programming to calculate the extent of influence. This method is particularly effective when the extent to which a calorific value of each information processing unit influences the intake air temperature of each air conditioner is calculated without affecting each information processing unit. In addition, the above method makes it possible to calculate and change the extent of influence at regular time intervals, thereby making it possible to cope with a change of an operation mode of each information processing unit.

Next, how to make calculations to minimize the power consumption of the individual air conditioners by the power-consumption minimization calculation module 633 of the air-conditioner monitoring and controlling unit 600 will be described with reference to FIG. 8.

FIG. 8 is a flowchart illustrating how to make calculations to minimize the power consumption of the individual air conditioners by the power-consumption minimization calculation module 633.

First of all, the power-consumption minimization calculation module 633 obtains intake air temperature Tapi (j) of each j-th information processing unit (j=1 through the number of information processing units), and then saves a deviation ΔTap (j) from an intake-air upper limit temperature value Tapilim (j) of each j-th information processing unit (S800). The deviation ΔTap (j) is expressed by the following equation 4:

$$\Delta Tap(j) = Tapilim(j) - Tapi(j) \qquad \text{(Equation 4)}$$

Next, under a constrained condition in which the deviation ΔTap (j) ? 0 expressed by the equation 4, on the assumption that an evaluation function is the sum of squares (S(ΔTap (j))$^2$) of a deviation in intake air temperature of each j-th information processing unit (j=1 through the number of information processing units), the discharge air temperature Taco (i) of cool air from each air conditioner, which minimizes the evaluation function, is calculated by, for example, a mathematical programming technique such as quasi-Newton method. The discharge air temperature Taco (i) is then saved. Concurrently with this, the power consumption Lac (i) and cooling capacity Qac (i) of each i-th air conditioner, both of which are calculated at this stage, are also saved (S801). The above processing is performed the number of times equivalent to the number of air conditioners (i=1 through the number of air conditioners). Here, a correlation between the intake air temperature of each information processing unit and the discharge air temperature of cool air from each air conditioner is determined on the basis of the temperature sensitivity coefficients calculated by the temperature sensitivity calculation module 632. In addition, a correlation between the discharge air temperature of each information processing unit and the intake air temperature of cool air from each air conditioner is determined on the basis of the temperature sensitivity coefficients calculated by the temperature sensitivity calculation module 632, and is determined by the air-conditioner cycle calculation module 635.

Next, the air-conditioner cycle calculation module 635 calculates the power consumption of each i-th air conditioner by using, as an initial value, the solution of Taco (i) (the discharge air temperature of each i-th air conditioner) that has been obtained in the step S801. On the assumption that an evaluation function is the sum total (SLac (i)) of the power consumption of each i-th air conditioners (i=1 through the number of air conditioners), the discharge air temperature Taco (i) of each i-th air conditioner, which minimizes the evaluation function, is calculated. The discharge air temperature Taco (i) is then saved. Concurrently with this, the power consumption Lac (i) and cooling capacity Qac (i) of each i-th air conditioner, both of which are calculated at this stage, are also saved (S802). Also in the step S802, a constrained condition is that the intake air temperature of each information processing unit does not exceed a maximum value of the intake air temperature of each information processing unit (ΔTap (j) ? 0). The reason why the step S802 is executed is that a maximum value point of an efficiency characteristic curve of each air conditioner moves in response to the discharge air temperature of the air conditioner, and accordingly, the optimization at the maximum value point is required.

Next, the sum total (SQac (i)) of the cooling capacity Qac (i) of each i-th air conditioner (i=1 through the number of air conditioners), each of which has been determined in the step S802, is calculated. This sum total means the sum total of calorific values of the individual information processing units installed in the computer room. Next, constrained conditions are defined as follows: the sum total SQac (i)=constant; a deviation ΔTap (j) ? 0; and the calorific value of each j-th information processing unit ? an offset value of the calorific value of each j-th information processing unit (or the calorific value of each j-th information processing unit=0 (the information processing unit is in a stopped state)). On the assumption that an evaluation function is the sum total (SLac (i)) of the power consumption of each i-th air conditioner (i=1 through the number of air conditioners), the evaluation function is minimized to calculate a calorific value Qap (j) of each j-th information processing unit (or a calorific value Qap (j) of a zone into which racks are grouped). The calorific value Qap (j) is then saved. Concurrently with this, the power consumption Lac (i) and cooling capacity Qac (i) of each i-th air conditioner, both of which are calculated at this stage, are also saved (S803). Incidentally, the offset value of the calorific value of each j-th information processing unit means a minimum calorific value produced by each j-th information processing unit even in a no-load state when each j-th information processing unit is powered on. Here, if it is found from the calculation that a calorific value of an information processing unit=0 (more specifically, if there is an information processing unit that is in a stopped state), a value of the left-hand side of "the sum total (SQac (i))=constant" (constrained condition) is recalculated by "the sum total=the above sum total—the sum of offset values of information processing units in a stopped state". This is because an information processing unit in a stopped state produces no calorific value handled as an offset value. As evaluation of this calorific value, a calorific value of each j-th information processing unit is in linear relationship with the difference in intake/discharge cool air temperature of each information processing unit.

The above example describes the calculation based on nonlinear programming. However, the above-described calculations can be made in a short period of time by creating beforehand a quasi-linear approximate expression of air conditioner characteristics, and a linear approximate expression of the temperature sensitivity.

It is not always necessary to make all of the calculations in the steps S801 through S803. For example, only the calculation in the step S801, or the calculation up to the step S802, suffices depending on requested energy saving effects. Preferably, all of the calculations are made to achieve the maximum energy saving effects.

If all of the steps S801 through S803 are executed, the air-conditioner monitoring and controlling unit 600 outputs the set temperature of each air conditioner and a calorific value of each information processing unit, both of which are obtained in the steps S801 through S803, to each air conditioner and the information-processing-unit monitoring and controlling unit 500 from the air-conditioner set-temperature change instruction unit 630 through the data input/output unit 610.

As described in the above embodiment, the present invention makes it possible to provide an energy saving control method for minimizing the power consumption of the air-conditioning facilities with cool air temperature conditions, which are required by the individual information processing units disposed in the computer room, satisfied.

Moreover, according to the present invention, it is possible to provide a system in which the ideal distribution of heat generation in the computer room viewed from the air conditioning facility side (more specifically, a ratio of a load placed on each information processing unit) is calculated to reduce the power consumption of the computer room as a whole in cooperation with the monitoring and controlling unit on the information processing unit side.

What is claimed is:

1. An air-conditioning facility control system for a computer room in which one or more information processing units and one or more air conditioners are placed, said system comprising:
   temperature sensors configured to measure temperature, each temperature sensor being provided at an intake air portion through which air circulating in the computer room is taken into the information processing unit, at a discharge air portion through which the air taken into the information processing unit is discharged, at an intake air portion through which air circulating in the computer room is taken into the air conditioner, and at a discharge air portion through which the air taken into the air conditioner is discharged;
   an information-processing-unit monitoring and controlling unit configured to monitor and control the individual information processing units; and
   an air-conditioner monitoring and controlling unit configured to monitor and control the individual air conditioners, and configured to input the output of the individual temperature sensors; wherein:
   the information-processing-unit monitoring and controlling unit or the air-conditioner monitoring and controlling unit includes an information processing unit database in which data about specifications and locations of the information processing units are accumulated;
   the air-conditioner monitoring and controlling unit includes:
   a data input/output unit configured to input/output data from/to the individual air conditioners and the information-processing-unit monitoring and controlling unit;
   a storage unit configured to store temperature data collected by the individual temperature sensors; and
   an individual air-conditioner set temperature instruction unit configured to control the discharge air temperature of air discharged from the individual air conditioners; and
   the individual air-conditioner set temperature instruction unit includes:
   an air-conditioner set-temperature change calculation module configured to change set temperature of each of the air conditioners;
   an information-processing-unit intake-air temperature allowance calculation module configured to calculate a deviation of temperature of intake air taken into each of the information processing units from an upper limit thereof;
   an air-conditioner cycle calculation module configured to calculate a cooling cycle of each of the air conditioners to determine the power consumption of the air conditioner; and
   a temperature sensitivity calculation module configured to calculate a temperature sensitivity coefficient of each of the information processing units associated with each of the air conditioners, and a temperature sensitivity coefficient of each of the air conditioners associated with each of the information processing units,
   wherein:
   based on the computer room that is actually operating or by means of heat fluid simulation in which the computer room is modeled, the temperature sensitivity calculation module successively changes discharge air temperature of air discharged from each of the air conditioners by a specified temperature width, measures a change in temperature by the temperature sensor disposed at the intake air portion of each of the information processing units, and a change in temperature by the temperature sensor disposed at the discharge air portion of each of the information processing units or inputs calculated values of changes in temperature of air in each of the information processing units space based on heat fluid simulation, divides the change in temperature of air at the intake air portion of each of the information processing units, and the change in temperature of air at the discharge air portion of each of the information processing units, by the temperature width by which the discharge air temperature of the air discharged from each of the air conditioners has been changed, to thereby obtain temperature sensitivity coefficients of each of the information processing units associated with each of the air conditioners, and then saves the temperature sensitivity coefficients; and
   the temperature sensitivity calculation module successively changes air temperature at the discharge air portion of each of the information processing units by a specified temperature width, inputs air temperature at an intake air portion of each of the air conditioners, and divides a change in temperature at the intake air portion of each of the air conditioners by the temperature width by which the air temperature at the discharge air portion of each of the information processing units has been changed, to thereby obtain temperature sensitivity coefficients of each of the air conditioners associated with each of the information processing units, and then saves the temperature sensitivity coefficients.

2. An air-conditioning facility control system for a computer room in which one or more information processing units and one or more air conditioners are placed, said system comprising:
   temperature sensors configured to measure temperature, each temperature sensor being provided at an intake air portion through which air circulating in the computer room is taken into the information processing unit, at a discharge air portion through which the air taken into the information processing unit is discharged, at an intake air portion through which air circulating in the computer room is taken into the air conditioner, and at a discharge air portion through which the air taken into the air conditioner is discharged;
   an information-processing-unit monitoring and controlling unit configured to monitor and control the individual information processing units; and
   an air-conditioner monitoring and controlling unit configured to monitor and control the individual air conditioners, and configured to input the output of the individual temperature sensors;
   wherein:
   the information-processing-unit monitoring and controlling unit or the air-conditioner monitoring and controlling unit includes an information processing unit database in which data about specifications and locations of the information processing units are accumulated;

the air-conditioner monitoring and controlling unit includes:
a data input/output unit configured to input/output data from/to the individual air conditioners and the information-processing-unit monitoring and controlling unit;
a storage unit configured to store temperature data collected by the individual temperature sensors; and
an individual air-conditioner set temperature instruction unit configured to control the discharge air temperature of air discharged from the individual air conditioners; and the individual air-conditioner set temperature instruction unit includes:
an air-conditioner set-temperature change calculation module configured to change set temperature of each of the air conditioners;
an information-processing-unit intake-air temperature allowance calculation module configured to calculate a deviation of temperature of intake air taken into each of the information processing units from an upper limit thereof;
an air-conditioner cycle calculation module configured to calculate a cooling cycle of each of the air conditioners to determine the power consumption of the air conditioner; and
a temperature sensitivity calculation module configured to calculate a temperature sensitivity coefficient of each of the information processing units associated with each of the air conditioners, and a temperature sensitivity coefficient of each of the air conditioners associated with each of the information processing units, based on the computer room that is actually operating or by means of heat fluid simulation in which the computer room is modeled, the temperature sensitivity calculation module successively changes discharge air temperature of air discharged from each of the air conditioners by a specified temperature width, measures a change in temperature by the temperature sensor disposed at the intake air portion of each of the information processing units, and a change in temperature by the temperature sensor disposed at the discharge air portion of each of the information processing units or inputs calculated values of changes in temperature of air in each of the information processing units space based on heat fluid simulation, divides the change in temperature of air at the intake air portion of each of the information processing units, and the change in temperature of air at the discharge air portion of each of the information processing units, by the temperature width by which the discharge air temperature of the air discharged from each of the air conditioners has been changed, to thereby obtain temperature sensitivity coefficients of each of the information processing units associated with each of the air conditioners, and then saves the temperature sensitivity coefficients;

the temperature sensitivity calculation module successively changes air temperature at the discharge air portion of each of the information processing units by a specified temperature width, inputs air temperature at an intake air portion of each of the air conditioners, and divides a change in temperature at the intake air portion of each of the air conditioners by the temperature width by which the air temperature at the discharge air portion of each of the information processing units has been changed, to thereby obtain temperature sensitivity coefficients of each of the air conditioners associated with each of the information processing units, and then saves the temperature sensitivity coefficients;

the information-processing-unit intake-air temperature allowance calculation module refers to the temperature sensitivity coefficients of each of the information processing units associated with each of the air conditioners, calculates a deviation of a temperature value measured by the temperature sensor disposed at the intake air portion of each of the information processing units placed in the actually operating computer room from an upper limit of intake air temperature of each of the information processing units, which is stored in the information processing unit database, and then saves the deviation; and the air-conditioner set-temperature change calculation module calculations discharge air temperature of air discharged from each of the air conditioners in such a manner that the sum of squares of the deviation becomes the smallest and stores the resulting value therein, and then outputs the discharge air temperature of the air discharged from each of the air conditioners to each of the air conditioners from the data input/output unit as control instruction temperature of each of the air conditioners.

3. The air-conditioning facility control system according to claim 2, wherein:
the discharge air temperature of the air discharged from each of the air conditioners is not output to each of the air conditioners as the control instruction temperature; and
the air-conditioner set-temperature change calculation module refers to the temperature sensitivity coefficients of each of the information processing units associated with each of the air conditioners, and calculates discharge air temperature of air discharged from each of the air conditioners in such a manner that on the assumption that the discharge air temperature of the air discharged from each of the air conditioners is an initial value and the sum total of the power consumption of the individual air conditioners becomes the smallest, and stores the resulting value therein, and then outputs the discharge air temperature of the air discharged from each of the air conditioners, which minimizes the sum total of the power consumption of the individual air conditioners, to each of the air conditioners from the data input/output unit as control instruction temperature of each of the air conditioners.

4. A power management system for a computer room in which one or more information processing units and one or more air conditioners are placed, said system comprising:
temperature sensors configured to measure temperature, each temperature sensor being provided at an intake air portion through which air circulating in the computer room is taken into the information processing unit, at a discharge air portion through which the air taken into the information processing unit is discharged, at an intake air portion through which air circulating in the computer room is taken into the air conditioner, and at a discharge air portion through which the air taken into the air conditioner is discharged;
an information-processing-unit monitoring and controlling unit configured to monitor and control the individual information processing units; and an air-conditioner monitoring and controlling unit configured to monitor and control the individual air conditioners, and configured to input the output of the individual temperature sensors; wherein: the information-processing-unit monitoring and controlling unit or the air-conditioner monitoring and controlling unit includes an information processing unit database in which data about specifications and locations of the information processing units are accumulated;

the air-conditioner monitoring and controlling unit includes:

a data input/output unit configured to input/output data from/to the individual air conditioners and the information-processing-unit monitoring and controlling unit;

a storage unit configured to store temperature data collected by the individual temperature sensors; and an individual air-conditioner set temperature instruction unit configured to control the discharge air temperature of air discharged from the individual air conditioners;

the individual air-conditioner set temperature instruction unit includes:

an air-conditioner set-temperature change calculation module configured to change set temperature of each of the air conditioners;

an information-processing-unit intake-air temperature allowance calculation module configure to calculate a deviation of temperature of intake air taken into each of the information processing units from an upper limit thereof;

an air-conditioner cycle calculation module configured to calculate a cooling cycle of each of the air conditioners to determine the power consumption of the air conditioner; and a temperature sensitivity calculation module configured to calculate a temperature sensitivity coefficient of each of the information processing units associated with each of the air conditioners, and a temperature sensitivity coefficient of each of the air conditioners associated with each of the information processing units; and the information-processing-unit monitoring and controlling unit includes:

a data input/output unit configured to input an operational state of each of the information processing units, and configured to give an instruction to assign a job to each of the information processing units;

an information-processing-unit monitoring unit configured to monitor each of the information processing units; and an information-processing-unit job instruction unit configured to calculate assignment of a job (load) to each of the information processing units, and configured to then give an instruction to assign the job, wherein:

based on the computer room that is actually operating or by means of heat fluid simulation in which the computer room is modeled, the temperature sensitivity calculation module successively changes discharge air temperature of air discharged from each of the air conditioners by a specified temperature width, measures a change in temperature by the temperature sensor disposed at the intake air portion of each of the information processing units, and a change in temperature by the temperature sensor disposed at the discharge air portion of each of the information processing units or inputs calculated values of changes in temperature of air in each of the information processing units space based on heat fluid simulation, divides the change in temperature of air at the intake air portion of each of the information processing units, and the change in temperature of air at the discharge air portion of each of the information processing units, by the temperature width by which the discharge air temperature of the air discharged from each of the air conditioners has been changed, to thereby obtain temperature sensitivity coefficients of each of the information processing units associated with each of the air conditioners, and then saves the temperature sensitivity coefficients; and the temperature sensitivity calculation module successively changes air temperature at the discharge air portion of each of the information processing units by a specified temperature width, inputs air temperature at an intake air portion of each of the air conditioners, and divides a change in temperature at the intake air portion of each of the air conditioners by the temperature width by which the air temperature at the discharge air portion of each of the information processing units has been changed, to thereby obtain temperature sensitivity coefficients of each of the air conditioners associated with each of the information processing units, and then saves the temperature sensitivity coefficients.

5. A power management system for a computer room in which one or more information processing units and one or more air conditioners are placed, said system comprising:

temperature sensors configured to measure temperature, each temperature sensor being provided at an intake air portion through which air circulating in the computer room is taken into the information processing unit, at a discharge air portion through which the air taken into the information processing unit is discharged, at an intake air portion through which air circulating in the computer room is taken into the air conditioner, and at a discharge air portion through which the air taken into the air conditioner is discharged;

an information-processing-unit monitoring and controlling unit configured to monitor and control the individual information processing units; and an air-conditioner monitoring and controlling unit configured to monitor and control the individual air conditioners, and configured to input the output of the individual temperature sensors;

wherein:

the information-processing-unit monitoring and controlling unit or the air-conditioner monitoring and controlling unit includes an information processing unit database in which data about specifications and locations of the information processing units are accumulated;

the air-conditioner monitoring and controlling unit includes:

a data input/output unit configured to input/output data from/to the individual air conditioners and the information-processing-unit monitoring and controlling unit;

a storage unit configured to store temperature data collected by the individual temperature sensors; and an individual air-conditioner set temperature instruction unit configured to control the discharge air temperature of air discharged from the individual air conditioners;

the individual air-conditioner set temperature instruction unit includes:

an air-conditioner set-temperature change calculation module configured to change set temperature of each of the air conditioners;

an information-processing-unit intake-air temperature allowance calculation module configured to calculate a deviation of temperature of intake air taken into each of the information processing units from an upper limit thereof;

an air-conditioner cycle calculation module configured to calculate a cooling cycle of each of the air conditioners to determine the power consumption of the air conditioner; and a temperature sensitivity calculation module configured to calculate a temperature sensitivity coefficient of each of the information processing units associated with each of the air conditioners, and a temperature sensitivity coefficient of each of the air conditioners associated with each of the information processing units; and the information-processing-unit monitoring and controlling unit includes:

a data input/output unit configured to input an operational state of each of the information processing units, and configured to give an instruction to assign a job to each of the information processing units;

an information-processing-unit monitoring unit configured to monitor each of the information processing units; and an information-processing-unit job instruction unit configured to calculate assignment of a job (load) to each of the information processing units, and configured to then give an instruction to assign the job, wherein the air-conditioner set-temperature change calculation module refers to the temperature sensitivity coefficients of each of the air conditioners associated with each of the information processing units, calculates a calorific value of each of the information processing units, or a calorific value of a rack group into which racks each storing information processing units are grouped, which minimizes the sum total of the power consumption of the individual air conditioners, under a condition in which the sum total of the calorific values becomes equivalent to the sum total of the cooling capacity of each of the air conditioners at the calculated discharge air temperature of cooling air from each of the air conditioners, and saves the calorific value, and then transmits the resulting calorific value to the information-processing-unit monitoring and controlling unit through the data input/output unit.

6. A power management system for a computer room in which one or more information processing units and one or more air conditioners are placed, said system comprising:

temperature sensors configured to measure temperature, each temperature sensor being provided at an intake air portion through which air circulating in the computer room is taken into the information processing unit, at a discharge air portion through which the air taken into the information processing unit is discharged, at an intake air portion through which air circulating in the computer room is taken into the air conditioner, and at a discharge air portion through which the air taken into the air conditioner is discharged;

an information-processing-unit monitoring and controlling unit configured to monitor and control the individual information processing units; and an air-conditioner monitoring and controlling unit configured to monitor and control the individual air conditioners, and configured to input the output of the individual temperature sensors;

wherein:

the information-processing-unit monitoring and controlling unit or the air-conditioner monitoring and controlling unit includes an information processing unit database in which data about specifications and locations of the information processing units are accumulated;

the air-conditioner monitoring and controlling unit includes:

a data input/output unit configured to input/output data from/to the individual air conditioners and the information-processing-unit monitoring and controlling unit;

a storage unit configured to store temperature data collected by the individual temperature sensors; and an individual air-conditioner set temperature instruction unit configured to control the discharge air temperature of air discharged from the individual air conditioners;

the individual air-conditioner set temperature instruction unit includes:

an air-conditioner set-temperature change calculation module configured to change set temperature of each of the air conditioners;

an information-processing-unit intake-air temperature allowance calculation module configured to calculate a deviation of temperature of intake air taken into each of the information processing units from an upper limit thereof;

an air-conditioner cycle calculation module configured to calculate a cooling cycle of each of the air conditioners to determine the power consumption of the air conditioner; and a temperature sensitivity calculation module configured to calculate a temperature sensitivity coefficient of each of the information processing units associated with each of the air conditioners, and a temperature sensitivity coefficient of each of the air conditioners associated with each of the information processing units; and the information-processing-unit monitoring and controlling unit includes:

a data input/output unit configured to input an operational state of each of the information processing units, and configured to give an instruction to assign a job to each of the information processing units;

an information-processing-unit monitoring unit configured to monitor each of the information processing units; and an information-processing-unit job instruction unit configured to calculate assignment of a job (load) to each of the information processing units, and configured to then give an instruction to assign the job, wherein:

the air-conditioner set-temperature change calculation module refers to the temperature sensitivity coefficients of each of the air conditioners associated with each of the information processing units, calculates a calorific value of each of the information processing units, or a calorific value of a rack group into which racks each storing information processing units are grouped, which minimizes the sum total of the power consumption of the individual air conditioners, under a condition in which the sum total of the calorific values becomes equivalent to the sum total of the cooling capacity of each of the air conditioners at the calculated discharge air temperature of cooling air from each of the air conditioners, and saves the calorific value, and then transmits the resulting calorific value to the information-processing-unit monitoring and controlling unit through the data input/output unit; and referring to the calorific value of each of the information processing units, or the calorific value of the rack group into which racks each storing information processing units are grouped, which has been transmitted from the air-conditioner monitoring and controlling unit, the information-processing-unit job instruction unit optimizes assignment of jobs to the individual information processing units, and saves the assignment, and then gives a job instruction to each of the information processing units through the data input/output unit.

7. An air-conditioning facility control method of an air-conditioning facility control system for a computer room in which one or more information processing units and one or more air conditioners are placed, said system comprising:
an information-processing-unit monitoring and controlling unit for monitoring and controlling the individual information processing units,
an air-conditioner monitoring and controlling unit for monitoring and controlling the individual air conditioners, and for inputting the output of the individual temperature sensors, and
the information-processing-unit monitoring and controlling unit or the air-conditioner monitoring and controlling unit includes an information processing unit database in which data about specifications and locations of the information processing units are accumulated, said method comprising the steps of:
providing temperature sensors for measuring temperature, each temperature sensor being provided at an intake air portion through which air circulating in the computer room is taken into the information processing unit, at a discharge air portion through which the air taken into the information processing unit is discharged, at an intake air portion through which air circulating in the computer room is taken into the air conditioner, and at a discharge air portion through which the air taken into the air conditioner is discharged;
the air-conditioner monitoring and controlling unit collecting information about temperature measured by the individual temperature sensors; the air-conditioner monitoring and controlling unit, on the basis of the temperature information, determining temperature sensitivity coefficients for the intake air temperature and discharge air temperature of each of the information processing units associated with discharge air temperature of each of the air conditioners, and temperature sensitivity coefficients for intake air temperature of each of the air conditioners associated with discharge air temperature of each of the information processing units;
the air-conditioner monitoring and controlling unit, on the basis of the temperature sensitivity coefficients for the intake air temperature and discharge air temperature of each of the information processing units associated with the discharge air temperature of each of the air conditioners, determining discharge air temperature of each of the air conditioners in such a manner that the sum of squares of a deviation of the discharge air temperature of each of the information processing units becomes the smallest, and determining the power consumption and cooling capacity at the discharge air temperature of each of the air conditioners at this point of time;
the air-conditioner monitoring and controlling unit, on the basis of the temperature sensitivity coefficients for the intake air temperature and discharge air temperature of each of the information processing units associated with the discharge air temperature of each of the air conditioners, determining discharge air temperature of each of the air conditioners in such a manner that the sum total of the power consumption of the individual air conditioners becomes the smallest, and determining the power consumption and cooling capacity at the discharge air temperature of each of the air conditioners at this point of time; and the air-conditioner monitoring and controlling unit, outputting the discharge air temperature of each of the air conditioners, which minimizes the sum of squares of a deviation of the discharge air temperature of each of the information processing units, or the discharge air temperature of each of the air conditioners, which minimizes the sum total of the power consumption of the individual air conditioners, to each of the air conditioners as set temperature thereof.

8. A power management method of a power management system for a computer room in which one or more information processing units and one or more air conditioners are placed, said system comprising:
an information-processing-unit monitoring and controlling unit for monitoring and controlling the individual information processing units; and
an air-conditioner monitoring and controlling unit for monitoring and controlling the individual air conditioners, and for inputting the output of the individual temperature sensors,
the information-processing-unit monitoring and controlling unit or the air-conditioner monitoring and controlling unit includes an information processing unit database in which data about specifications and locations of the information processing units are accumulated, said power management method comprising the steps of:
providing temperature sensors for measuring temperature, each temperature sensor being provided at an intake air portion through which air circulating in the computer room is taken into the information processing unit, at a discharge air portion through which the air taken into the information processing unit is discharged, at an intake air portion through which air circulating in the computer room is taken into the air conditioner, and at a discharge air portion through which the air taken into the air conditioner is discharged;
the air-conditioner monitoring and controlling unit, collecting information about temperature measured by the individual temperature sensors;
the air-conditioner monitoring and controlling unit, on the basis of the temperature information, determining temperature sensitivity coefficients for the intake air temperature and discharge air temperature of each of the information processing units associated with discharge air temperature of each of the air conditioners, and temperature sensitivity coefficients for intake air temperature of each of the air conditioners associated with discharge air temperature of each of the information processing units;
the air-conditioner monitoring and controlling unit, on the basis of the temperature sensitivity coefficients for the intake air temperature and discharge air temperature of each of the information processing units associated with the discharge air temperature of each of the air conditioners, determining discharge air temperature of each of the air conditioners in such a manner that the sum of squares of a deviation of the discharge air temperature of each of the information processing units becomes the smallest, and determining the power consumption and cooling capacity at the discharge air temperature of each of the air conditioners at this point of time;
the air-conditioner monitoring and controlling unit, on the basis of the temperature sensitivity coefficients for the intake air temperature and discharge air temperature of each of the information processing units associated with the discharge air temperature of each of the air conditioners, determining a calorific value of each of the information processing units in such a manner that the sum total of the power consumption of the individual air conditioners becomes the smallest, and determining the power consumption and cooling capacity of each of the air conditioners at the calorific value of each of the information processing units at this point of time;

the air-conditioner monitoring and controlling unit, outputting the discharge air temperature of each of the air conditioners, which minimizes the sum of squares of a deviation of the discharge air temperature of each of the information processing units, or the discharge air temperature of each of the air conditioners, which minimizes the sum total of the power consumption of the individual air conditioners, to each of the air conditioners as set temperature thereof; and the air-conditioner monitoring and controlling unit, outputting the calorific value of each of the information processing units, which minimizes the sum total of the power consumption of the individual air conditioners, to the information-processing-unit monitoring and controlling unit.

* * * * *